United States Patent Office 3,428,430
Patented Feb. 18, 1969

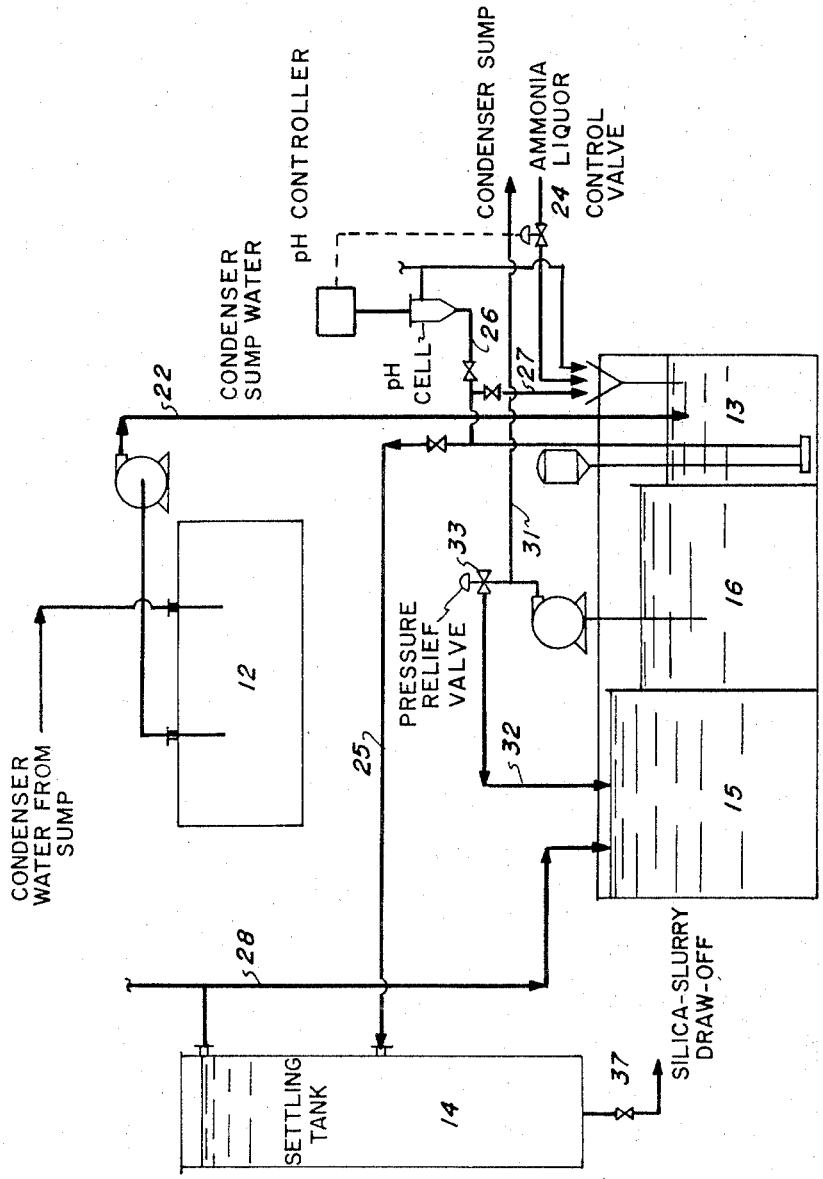

3,428,430
METHOD FOR DECREASING SLUDGE FORMATION IN PHOSPHORUS FURNACE SUMP
George H. Megar and Arnett Hendrix, Florence, Ala., assignors to Tennessee Valley Authority, a corporation of the United States
Filed Apr. 21, 1966, Ser. No. 544,270
U.S. Cl. 23—223
Int. Cl. C01b 25/02
6 Claims

ABSTRACT OF THE DISCLOSURE

A nonsilica-bearing fluorine compound, aqueous ammonium fluoride, is added to condenser spray water to maintain the atom ratio F:Si above 6 so that all Si from silica tetrafluoride in the furnace gas will be hydrolyzed to a soluble fluosilicate. Without the added F, the atom ratio will be about 4 and only about two-thirds of the Si will hydrolyze to soluble fluosilicate. The remaining one-third of the silica will form a gel which occludes phosphorus, water, and solids impurities as sludge from which phosphorus is not easily separated.

---

Our invention relates to an improvement in the production and recovery of phosphorus, more particularly to an improved process for treating phosphorus-bearing offgases from elemental phosphorus-producing electric furnaces during the production of phosphorus by smelting of phosphate rock, and still more particularly to a method for preventing the precipitation of silica as a gel that occludes condensed phosphorus to form a sludge, said silica normally being precipitated from the phosphorus-bearing offgases from such elemental phosphorus-producing electric furnaces.

Heretofore, it has been the practice in the chemical industry to produce elemental phosphorus from phosphate rock and silica by reducing the phosphate rock with coke or other carbonaceous reducing materials. Such a process is normally carried out in equipment, such as an electric smelting furnace, in which the phosphorus vapor therefrom carries with it such foreign matter as particles of rock, sand, reducing agent, and gaseous compounds of fluorine and silicon. The result of such process is that when the phosphorus vapor is condensed and collected under water in order to recover the phosphorus, some of the product upon removal from the condenser is found to be of the character of a sludge containing various concentrations of phosphorus as well as the above-mentioned impurities and water.

It is the usual practice in the industry to install electrostatic precipitators at the phosphorus furnaces for the purpose of removing the above-mentioned solid impurities from the gases prior to the condensation of phosphorus. However, the precipitators have been found to remove only about 60 to 90 percent of the solids in the gas. Also, some impurities, such as gaseous compounds of fluorine and silicon, pass through the precipitator and form solids when the gases are hydrated and cooled with water spray which is used to condense the phosphorus vapor to liquid phosphorus. These condensed solids along with the solids which are not removed from the gas in the electrostatic precipitators are also collected in the water-phosphorus mixture that drains from the condenser. In the condenser sump (vessel into which the condenser is drained) a layer of relatively high-grade phosphorus is obtained at the bottom; above this layer is a mixture referred to as sludge which consists of phosphorus droplets or globules, solid impurities, and water; and above this second layer is a water layer containing phosphorus droplets and solids in suspension. The boundary between the sludge and water suspension is not clearly defined.

The sludge is viscous and sometimes sticky. It consolidates during storage and become more viscous; it is difficult to pump and burn such consolidated sludge in conventional burner assemblies. In addition, acid produced by burning of such sludge is often found to be contaminated.

Various methods of preparation and recovery of the phosphorus from the sludge have been suggested in the prior art. Among these are filtration, centrifugation, distillation, and briquetting methods. These methods all have certain disadvantages such as high cost operation, maintenance, and investment. Also the efficiency of phosphorus recovery by each method leaves much to be desired. Our invention can be used to decrease the quantity of sludge formed and thereby decrease dependence on these methods for recovering phosphorus from sludge.

We have found that the offgases from such an electric furnace contain quantities of silicon tetrafluoride that reacts with water to form soluble fluosilicic acid and silica. The silica, which is relatively insoluble in the condenser water, has been found to impart highly undesirable properties to the sludge. For instance, this silica forms a gel in which it is combined with as much as 30 to 40 times its weight of water. Furthermore, because the silica is condensed from the offgases in the presence of condensing phosphorus, particles of the silica gel are found to intermix with and occlude particles of the phosphorus in the condenser sump.

Our invention is directed to an improved process for recovering phosphorus from that portion of the sludge caused by the precipitation of silica in the condenser water. Without the use of our invention, silica is precipitated in condenser spray water by the reactions:

$$3SiF_4(gas) + XH_2O \rightarrow 2H_2SiF_6(\text{aqueous solution})$$
$$+ SiO_2 \cdot XH_2O(\text{precipitate})$$

$$3SiF_4(gas) + 4NH_4OH \rightarrow 2(NH_4)_2SiF_6(\text{ammonium silico fluoride that is soluble in aqueous solution})$$
$$+ SiO_2 \cdot XH_2O(\text{precipitate}) \quad (2)$$

Ammonium hydroxide, shown in reaction (2), is normally added to condenser water to maintain the pH in the range 5.5 to 6.0.

In the above-mentioned reactions, silicon is precipitated as silica because insufficient fluorine is present to form silico fluoride ($SiF_6^=$) with all the silicon which leaves the furnace as silicon tetrafluoride ($SiF_4$); said silico fluoride ($SiF_6^=$) being soluble in the condenser water. In our invention, ammonium fluoride is added to the condenser water in proportions so as to provide an atomic ratio of fluorine to silicon of six or slightly higher so that all silicon from gaseous silicon tetrafluoride will be dissolved in condenser water as silico fluoride ($SiF_6^=$). In practice it may be necessary to provide a slightly higher atomic ratio of fluorine to silicon than 6 in order to provide leeway for reactions of compounds of fluorine with some compounds present as impurities which do not contain silicon. Except for a slight excess for this purpose and a slight excess to provide a margin for safety in controlling the ratio over the minimum requirements, no benefit is claimed for excess fluorine addition and its use is considered an unnecessary expense.

The reaction for the addition of fluorine to condenser water in our invention is:

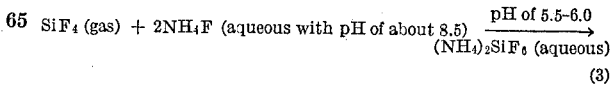

(3)

Ammonium fluoride for reaction 3 is obtained by ammoniating condenser water containing the ammonium silico fluoride to cause essentially complete precipitation of the silica; this occurs at a pH of about 8.5 and is shown by the reaction:

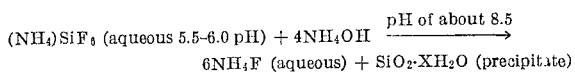

$$(NH_4)SiF_6 \text{ (aqueous 5.5-6.0 pH)} + 4NH_4OH \xrightarrow{\text{pH of about 8.5}}$$
$$6NH_4F \text{ (aqueous)} + SiO_2 \cdot XH_2O \text{ (precipitate)}$$

After precipitated silica and other suspended solids are separated by settling, clarified ammonium fluoride solution is recycled to the condenser sump. Ammonium fluoride solution in excess of that required for return to the condenser sump to maintain the atomic ratio of fluoride to silicon in the desired range is treated with lime which reacts with the fluoride, phosphoric acid, and some of the ammonium hydroxide contained therein to form insoluble compounds. After separation of the insoluble compounds the remaining liquid containing a part of its initial ammonium hydroxide is reused to ammoniate condenser water as in reaction (4).

It is therefore an object of the present invention to provide an improved method of treating condenser water in which a larger part of the elemental or uncombined phosphorus in the furnace gas can be recovered in a relatively pure state and in a simple and economical manner.

Still another object of the present invention is to provide a method for removing suspended or soluble compounds of silica from the condenser water so that gas lines from the condenser will not be stopped up with silica in condenser water carried out as entrainment in the gas.

A still further object of the present invention is to provide an improved method for the recovery of clean phosphorus by keeping the condenser water free of suspended silica particles, thereby eliminating this source of contamination from the point where phosphorus is condensed by the water spray.

A still further object of the present invention is to provide a means for removing the ammonium hydroxide from the ammonium fluoride liquor in excess of that required for return to the condenser sump to maintain the atomic ratio of fluoride to silicon in the desired range.

Our invention, together with further objects and advantages thereof, will be better understood from a consideration of the following descriptions taken in connection with the accompanying drawings, which diagrammatically illustrate an application of the principles of our invention in a preferred embodiment in which:

FIGURE 3 is a diagrammatical illustration of the preferred embodiment of the present arrangement for preparing ammonium fluoride solution for addition to the condenser water.

Figure 1:
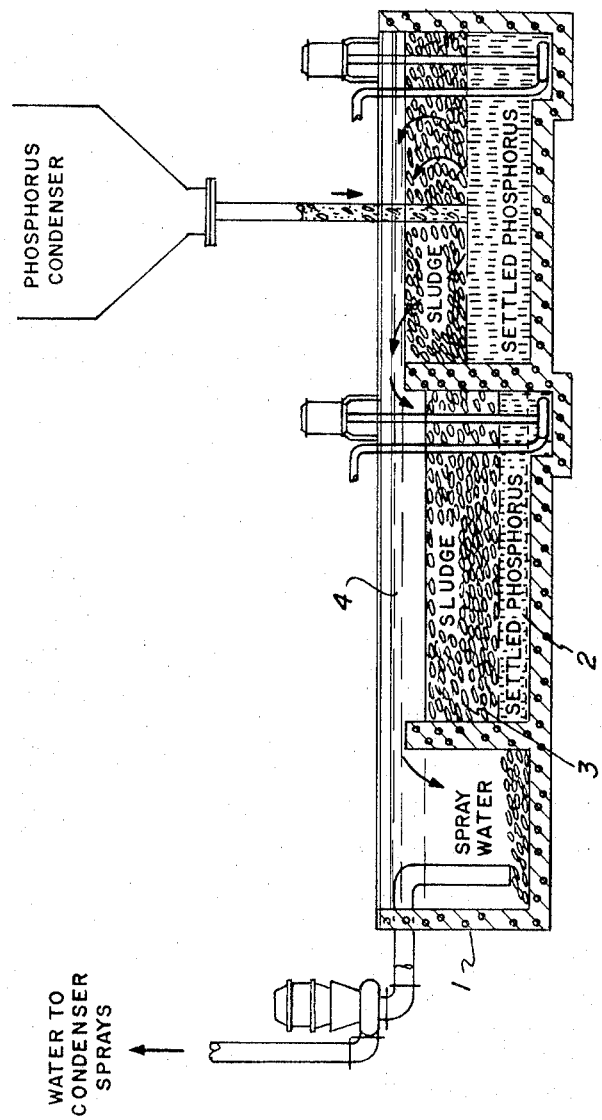
FIGURE 1 is a diagrammatical illustration of a phosphorus condenser sump showing how the phosphorus-sludge and water-suspension layers are collected in the sump.

Referring now more specifically to FIGURE 1, there is shown a condenser sump 1 in which a layer of relatively high-grade phosphorus is obtained as bottom layer 2. Above bottom layer 2 is shown a layer of the sludge 3 which consists of globules of phosphorus, solid impurities including precipitated silica and water. Above layer 3 is shown water layer 4 containing phosphorus globules and solids in suspension.

Microscopic examination of the sludge shows that it consists of globular particles of yellow phosphorus, 1 to 2 millimeters in diameter down to a few microns in size. Fine particulate matter is associated with the phosporus. The solids in the sludge result from the precipitation of solids in the condensing system and particles of the furnace charge being carried over into the condensing system. Following is the approximate composition of the solids fraction of the sludge: $P_4$, 40.6 percent; carbonaceous material, 26.7 percent; benzene insolubles, 32.7 percent; analysis of benzene insolubles—$P_2O_5$, 13.3 percent; $SiO_2$, 29.2 percent; CaO, 11.8 percent; $Fe_2O_3$, 1.2 percent, F, 5.4 percent; and other, 31.1 percent.

The sludge collected in condenser sump 1 may be pumped to an acid unit and burned to make phosphoric acid containing some solid materials from the sludge as impurities, or the material may be fed to a centrifuge where a large part of the phosphorus is separated as high-quality phosphorus. However, the residue from the centrifugation of sludge contains phosphorus which, while of small economic value, makes disposal of the residue without steam or atmospheric pollution a difficult problem.

Figure 2:
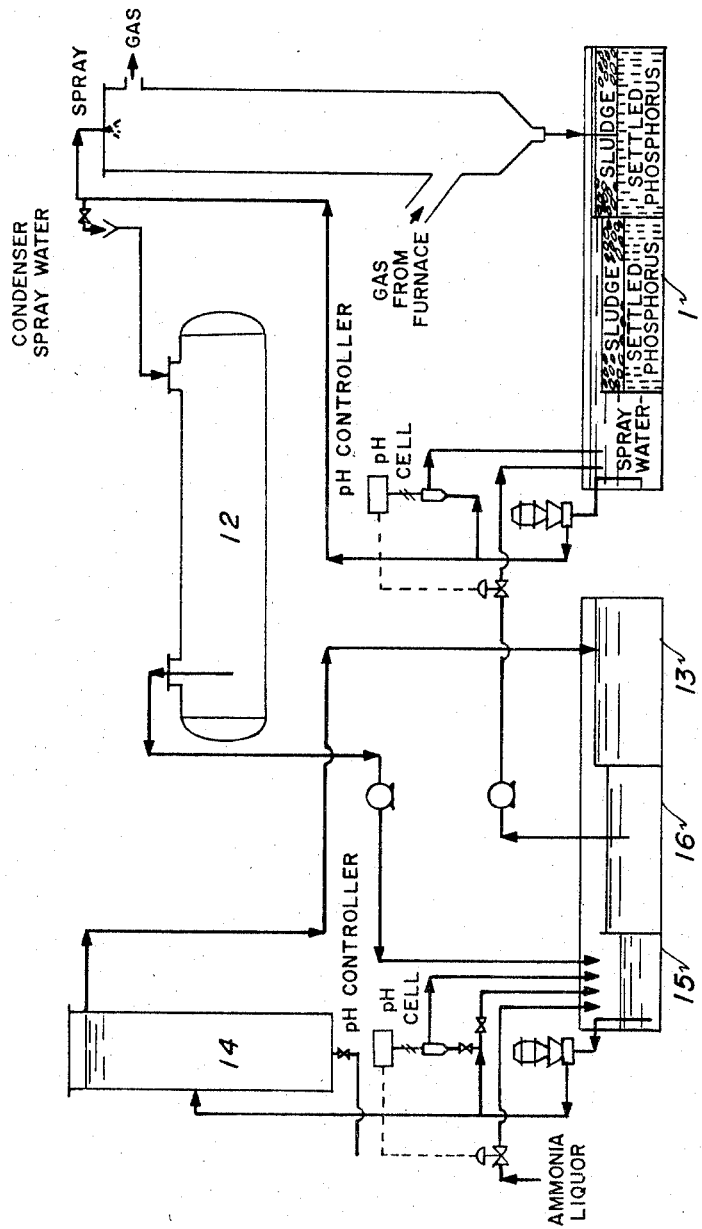
FIGURE 2 is a diagrammatical illustration showing the preferred method for collection of condenser sump water, treatment of said condenser sump water to remove silica, and addition of resultant ammonium fluoride solution to the condenser water.

Referring now more specifically to FIGURE 2, condenser water which has overflowed from the condenser sump 1 is collected in storage tank 12, where some heavier solids and some phosphorus settle out and are subsequently pumped and processed as sludge, the supernatant condenser water from which is pumped to compartment 15 where its pH is raised from about 5.5 to about 8.5 by the introduction of ammonia liquor such as aqueous ammonia or ammonium carbonate. The resultant ammoniated solution containing precipitated silica is pumped to vertical tank 14 where the larger particles of precipitated silica and other suspended solids settle out. Clarified ammonium fluoride solution overflows from tank 14 to compartment 13 which stays full at all times and in which compartment some secondary settling occurs. Clarified ammonium fluoride liquor overflows a baffle from compartment 13 into compartment 16 which is a reservoir from which it is pumped to furnace condenser sumps. A pump in compartment 16 maintains pressure in a pipeline to the furnace sumps.

Referring now more specifically to FIGURE 3, condenser water is pumped from storage tank 12 through line 22 to compartment 13 where it is ammoniated by means of automatic controls to a pH of about 8.5 to about 9.0. Ammonia liquor is added through line 24. The resultant slurry is pumped from compartment 13 through lines 25, 26, and 27; line 27 recycles to compartment 13 to effect mixing; line 26 supplies sample liquor to a pH cell for automatic control of the pH, and line 25 conveys the slurry to settling tank 14 where precipitated silica and other solids are drawn off intermittently through line 37. Clarified ammonium fluoride overflows through line 28 to compartment 15 which serves as a reservoir and secondary settling tank. Overflow from compartment 15 collects in compartment 16 from which it is pumped through line 31 to furnace condenser sump; liquor that passes through relief valve 33 in the line to the furnace sump flows through line 32 back to compartment 15.

In order that those skilled in the art may better understand how the present invention can be practiced, the following examples of processes we have used in the improved production and recovery of phosphorus wherein we have decreased the sludge formation through the utilization of ammonium fluoride liquor in electric phosphorus furnace sumps in a new, novel, and unique manner for ensuring the elimination of insoluble particles and gel of siliceous material, are given by way of illustration and not by way of limitation.

EXAMPLE I

Phosphorus was produced at a uniform rate in an electric furnace from a mixture of phosphate rock, coke, coal, and silica. Phosphorus and sludge collected in the condenser sump was pumped to storage tanks. For a period of 2 months when the condenser liquor was neutralized with ammonium hydroxide to maintain its pH in the range of 5.5 to 6.0 the average inches of phosphorus accumulated in the sump per day was 25 inches and the average inches of sludge was 29 inches. When clarified ammonium fluoride liquor with a pH of 8.5 to 9.0 was substituted for the ammonium hydroxide and added to maintain the pH of the condenser liquor at a pH of 5.5 to 6.0 for a period of 2 months, the average quantity of phosphorus accumulated in the furnace sump increased to 26½ inches per day and the average sludge decreased to 20 inches per day. This was a decrease of approximately 30 percent in the volume of sludge produced.

Analysis of sludge samples from the furnace before and during the test and during an interruption to the test are given in Table I below. These analyses show that the quality of phosphorus sludge increased from 63 percent phosphorus at the start of the test to 76 percent after about 12 days; the quality decreased to 70 percent when the use of ammonium fluoride liquor was interrupted for 2 days and ammonium hydroxide was used. The concentration of silica in the sludge was lowest, 2.3 percent, when the concentration of phosphorus in the sludge was highest; this indicates that the ammonium fluoride liquor was effective in decreasing the quantity of silica in the sludge and thereby caused the quality of sludge to increase and the quantity of sludge to decrease.

EXAMPLE IV

Ammonium fluoride liquor made by the ammoniation of condenser liquor bled off continuously at a rate of about 1½ to 2 gallons per minute but in excess of that required to maintain the pH of the condenser by recycling of ammonium fluoride liquor was removed from the system as clarified ammonium fluoride containing 20 to 30 grams per liter F, 30 to 40 grams per liter $NH_3$, and 25 to 35 grams per liter $P_2O_5$. Treatment of this liquor with lime caused most of the F and $P_2O_5$ to be rendered insoluble leaving a liquid from which the ammonia can be recovered. The reaction for this is:

$$2NH_4F + CaO \rightarrow 2NH_3 + CaF_2 + H_2O$$

Thus the use of ammonium fluoride permits the ammonia required for neutralization to be recovered for reuse and the fluorine to be rendered harmless for disposal as a water-insoluble material.

While we have shown and described particular embodi-

TABLE I.—ANALYSIS OF SLUDGE FROM NO. 2 FURNACE SUMP

| Date 1965 | | Analysis, percent | | | | | | Remarks |
|---|---|---|---|---|---|---|---|---|
| | | Dry basis | | | In B.I. | | | |
| | $H_2O$ | Carbonaceous material | $P_4$ | B.I. | CaO | $SiO_2$ | Other [a] | |
| 10/25 | 40.9 | 16.9 | 62.7 | 20.4 | 1.4 | 7.4 | 11.6 | Sampled before start of test. |
| 11/1 | 51.1 | 16.3 | 66.4 | 17.3 | 0.6 | 6.5 | 10.2 | Sampled during test. |
| 11/8 | 36.1 | 11.5 | 75.5 | 13.0 | 0.7 | 2.3 | 10.0 | Do. |
| 11/29 | 39.6 | 15.7 | 70.2 | 14.1 | 0.7 | 4.2 | 9.2 | Sampled during interruption in test.[b] |

[a] Probably carbon from coal and coke, $P_2O_5$ from phosphate, and minor constituents such as $Fe_2O_3$, $Al_2O_3$, and F from all components of charge to furnaces.
[b] Ran out of supply of clarified $NH_4F$; regular $NH_3$ liquor had been used for about 43 hours before this sample was taken.

EXAMPLE II

Phosphorus was produced in the electric furnace from a mixture of phosphate rock, coal, coke, and silica. Gas leaving the condenser system contains condenser water as entrainment; in normal operation this water is saturated with dissolved and suspended silica so that a small decrease in the temperature of the gas in the pipeline causes a liquid to condense and deposit a residue high in silica content that adheres to the sides of the pipe. During operation when ammonium fluoride was recycled to the condenser, the entrained water contained reduced amounts of compounds of silicon to the extent that cooling in the offgas pipe did not cause siliceous residue to accumulate. Thus, the result was a considerable decrease in buildup of solids in the offgas pipe.

EXAMPLE III

When tests of the use of recycled ammonium fluoride in place of ammonium hydroxide in the condenser sump (in the production of phosphorus in an electric furnace by the usual process) were started, the condenser sump contained much accumulated material which could not be pumped out by normal pumping methods. This material had accumulated during routine operation of the furnace over a period of months. Because the material had collected on the bottom and sides of the sump, the capacity of the sump to hold current production was decreased and measurements of the current production, based on volume of the sump per unit of depth, were inaccurate. After ammonium fluoride had been used for a few days, this accumulation began to be loosened and combined with the regular pump-out of phosphorus and sludge. At the end of the first month of use of ammonium fluoride, the accumulation was essenitally removed and there was no further buildup of unpumpable materials during the use of ammonium fluoride in the condenser water system. Thus ammonium fluoride is useful in removing accumulations of sludge residue from the furnace sumps and in preventing the buildup of unpumpable residue.

ments of our invention, modifications and variations thereof will occur to those skilled in the art. We wish it to be understood therefore that the appended claims are intended to cover such modifications and variations which are within the true scope and spirit of our invention.

What we claim as new and desire to secure by Letters Patent of the United States is:

1. In the method of producing phosphorus by smelting phosphate rock with a reducing agent and silica and thereafter condensing, collecting, and recovering the resultant phosphorus vapor by bringing it in contact with water sprays, and collecting the phosphorus as a liquid under water in the furnace condenser sump, adding ammonium hydroxide to condenser sump liquor to maintain pH at about 5.5 to about 6.0; and recycling a portion of said liquor in said sump to said water sprays, the improvement in combination therewith which comprises the steps of collecting a portion of said condenser sump liquor by overflow from the furnace condenser sump; adjusting the pH of said removed portion of overflow from said condenser sump to a pH of about 8.0 to about 9.0 by ammoniation thereof, said pH adjustment precipitating substantially all of the soluble compounds of silicon originally associated with said overflow condenser liquor and simultaneously obtaining ammonium fluoride; settling said resulting precipitated silica and thereby separating said silica from the condenser water; returning the resulting clarified ammonium fluoride liquor to said condenser sump in proportions sufficient to ultimately maintain the pH of said condenser sump liquor in the range of about 5.5 to about 6.0; thereafter substituting said clarified ammonium fluoride liquor for said ammonium hydroxide to maintain the pH of said condenser sump liquor in said range of about 5.5 to about 6.0; said process being characterized by the fact that the atomic ratio of fluorine to silicon in the condenser sump liquor is maintained in the range of about 6 to 10 of fluorine to 1 of silicon.

2. The process of claim 1 wherein the atomic ratio of fluorine to silicon in the condenser sump liquor is maintained in the range from about 6 to about 8.

3. The process of claim 1 wherein the atomic ratio of fluorine to silicon maintained in said condenser sump liquor is about 6.5.

4. In the method of producing phosphorus by smelting phosphate rock with a reducing agent and silica and thereafter condensing, collecting, and recovering the resultant phosphorus vapor by bringing it in contact with water sprays, and collecting the phosphorus as a liquid under water in the furnace condenser sump, adding ammonium hydroxide to condenser sump liquor to maintain pH at about 5.5 to about 6.0; and recycling a portion of said liquor in said sump to said water sprays, the improvement in combination therewith which comprises the steps of collecting a portion of said condenser sump liquor by overflow from the furnace condenser sump; adjusting the pH of said collected portion of overflow from said condenser sump to a pH of about 8.0 to about 9.0 by ammoniation thereof, said pH adjustment precipitating substantially all of the soluble compounds of silicon originally associated with said overflow condenser liquor and simultaneously obtaining ammonium fluoride; settling said resulting precipitated silica and thereby separating said silica from the condenser water; adjusting the pH of the resulting clarified ammonium fluoride liquor to the range of about 7.0 to about 8.0; returning the resulting pH-adjusted and clarified ammonium fluoride liquor to said condenser sump in proportions sufficient to ultimately maintain the pH of said condenser sump liquor in the range of about 5.5 to about 6.0; thereafter substituting said clarified ammonium fluoride liquor for said ammonium hydroxide to maintain the pH of said condenser sump liquor in said range of about 5.5 to about 6.0; said process being characterized by the fact that the atomic ratio of fluorine to silica in the condenser sump liquor is maintained in the range of about 6 to 10 of fluorine to 1 of silicon.

5. The process of claim 4 wherein the atomic ratio of fluorine to silicon in the condenser sump liquor is maintained in the range from about 6 to 8.

6. The process of claim 4 wherein the atomic ratio of fluorine to silicon maintained in said condenser sump liquor is about 6.5.

References Cited

UNITED STATES PATENTS

| | | | |
|---|---|---|---|
| 2,050,797 | 8/1936 | Kerschbaum et al. | 23—223 XR |
| 2,796,333 | 6/1957 | Wade | 23—223 |
| 3,084,029 | 4/1963 | Barber et al. | 23—223 |
| 3,113,839 | 12/1963 | Barber et al. | 23—223 XR |

OSCAR R. VERTIZ, *Primary Examiner.*

L. A. MARSH, *Assistant Examiner.*